United States Patent [19]
Wada

[11] Patent Number: 5,125,276
[45] Date of Patent: Jun. 30, 1992

[54] ELECTROMAGNETIC FLOWMETER

[75] Inventor: Ichiro Wada, Yokohama, Japan

[73] Assignee: Kabushiki Kaisha Toshiba, Kawasaki, Japan

[21] Appl. No.: 581,059

[22] Filed: Sep. 12, 1990

[30] Foreign Application Priority Data

Sep. 12, 1989 [JP] Japan .................. 1-236490

[51] Int. Cl.$^5$ .............................................. G01F 1/58
[52] U.S. Cl. ............................... 73/861.12; 73/861.15
[58] Field of Search ............ 73/861.11, 861.12, 861.15

[56] References Cited

U.S. PATENT DOCUMENTS

| | | |
|---|---|---|
| 3,373,608 | 3/1968 | Ketelsen . |
| 4,137,765 | 2/1979 | Matsushita . |
| 4,470,309 | 9/1984 | Wada ................................ 73/861.12 |
| 4,809,559 | 3/1989 | Kasai ................................ 73/861.12 |

FOREIGN PATENT DOCUMENTS

| | | |
|---|---|---|
| 1911556 | 9/1970 | Fed. Rep. of Germany ... 73/861.12 |
| 1963901 | 3/1972 | Fed. Rep. of Germany . |
| 3225226 | 2/1983 | Fed. Rep. of Germany . |

Primary Examiner—Reinhard J. Eisenzopf
Assistant Examiner—E. Shopbell
Attorney, Agent, or Firm—Oblon, Spivak, McClelland, Maier & Neustadt

[57] ABSTRACT

A pair of magnetic field generating units and a pair of measuring electrodes are mounted on a measuring pipe. The pair of magnetic field generating units generate a substantially functional distribution magnetic field in the measuring pipe. Each magnetic field generating unit has a plurality of coils. A turn ratio of the plurality of coils is substantially equal to a turn ratio of pieces obtained by dividing a sin distribution coil into N portions when the number of coils is given as N (N is an integer of 2 or more). The plurality of coils are constituted by, e.g., coils with pole pieces and saddle coils.

21 Claims, 8 Drawing Sheets

ELECTROMAGNETIC FLOWMETER

BACKGROUND OF THE INVENTION

1. Field of the Invention

The present invention relates to an electromagnetic flowmeter suitable for measurements of an eccentric flow fluid.

2. Description of the Related Art

It is difficult for an electromagnetic flowmeter to accurately measure a flow rate of an eccentric flow fluid (drifted fluid), as is well-known to those skilled in the art. The eccentric flow fluid is defined as a fluid having a disturbed flow. An eccentric flow is formed in an electromagnetic flowmeter when an upstream straight pipe connected to the electromagnetic flowmeter does not have a sufficient length, when a solid substance or rust is nonuniformly attached to the inner wall surface of the upstream pipe of the electromagnetic flowmeter or a solid substance is precipitated on the bottom of the upstream pipe, or when a fluid to be measured is a slurry containing a solid substance susceptible to precipitation or floating.

Figure 1:
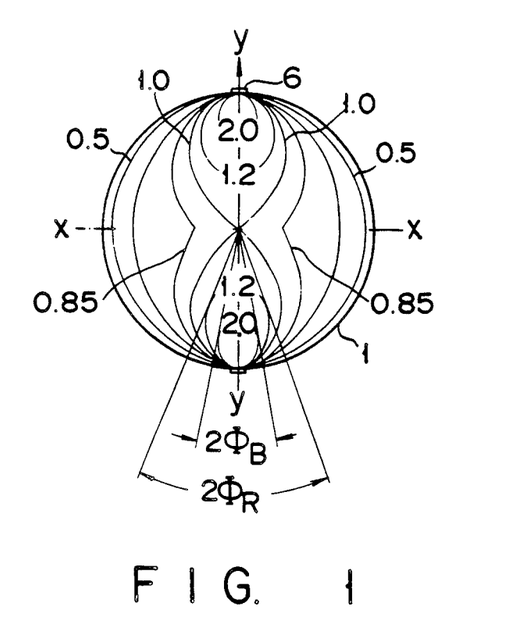
FIG. 1 is a view for explaining weighting function.

In order to accurately measure a flow rate of an eccentric flow fluid, an electromagnetic flowmeter having a function of generating a functional distribution magnetic field is developed. The functional distribution magnetic field is defined as a magnetic field having a magnetic flux density distribution close to a reciprocal number of a value of a weighting coefficient W which is virtually given in a measuring pipe 1, as shown in FIG. 1. Referring to FIG. 1, an angle $2\Phi_B$ is a spreading angle defined by lines which contact an area for weighting coefficient W=2.0 with respect to the center of the measuring pipe. An angle $2\Phi_R$ is an angle defined by lines which contact an area for weighting coefficient W=1.2.

Conventional electromagnetic flowmeters each having a function of generating a functional distribution magnetic field are shown in FIGS. 2A and 2B and FIGS. 3A and 3B.

Figure 2A:
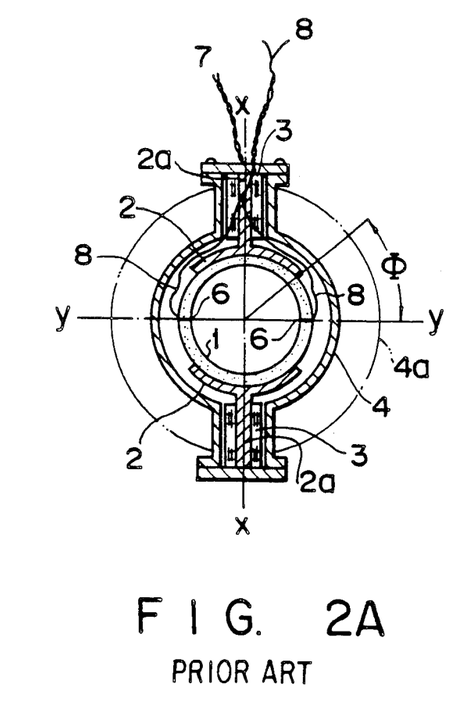
Figure 2B:
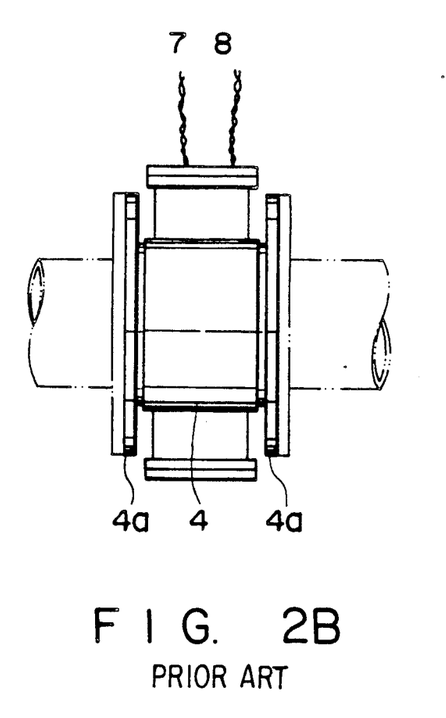

Referring to FIGS. 2A and 2B, a pair of substantially T-shaped yokes 2 are fixed to an outer wall surface of a measuring pipe 1 with small gaps therebetween. Coils 3 are respectively wound around yoke portions 2a extending in the radial direction of the measuring pipe. An outer casing 4 having end flanges 4a is mounted outside the measuring pipe 1. An electrode 6 extends through the wall surface of the measuring pipe 1. A signal from the electrode 6 is extracted outside the casing 4 through a signal line 8. The coils 3 are powered through a line 7.

Figure 3A:
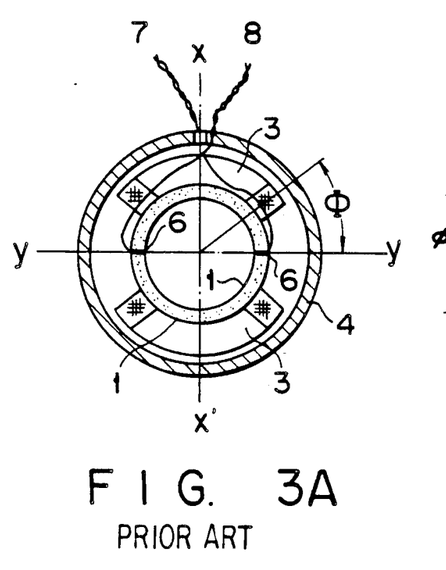
Figure 3B:
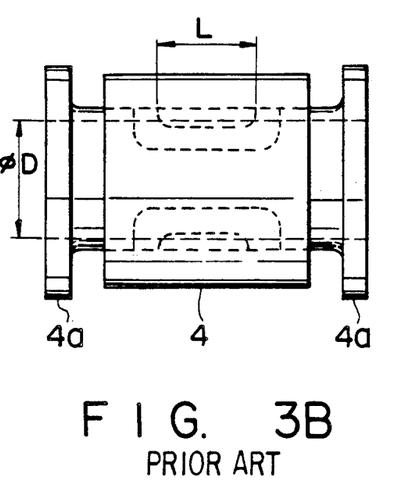
Figure 4:
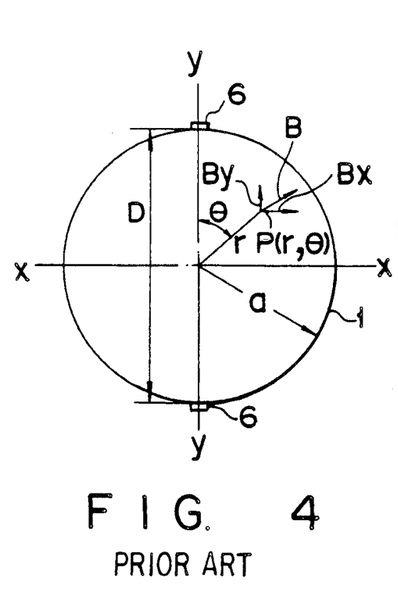

Referring to FIGS. 3A and 3B, a pair of saddle coils 3 comprising excitation windings are mounted in contact with the outer wall surface of a measuring pipe 1. Other arrangements of the electromagnetic flowmeter shown in FIGS. 3A and 3B ar the same as those in FIGS. 2A and 2B. The same reference numerals as in FIGS. 2A and 2B denote the same parts in FIGS. 3A and 3B, and a detailed description thereof will be omitted.

In order to obtain a functional distribution magnetic field in each conventional electromagnetic flowmeter described above, an angle $\Phi$ in FIGS. 2A and 3A is set to be a predetermined value. More specifically, the angle $\Phi$ is about 40° (it varies in accordance with the shape of the coils and configuration of magnetic flux generators) when a length L of the coil is set to be a half of the inner diameter of the measuring pipe, i.e., $L=(\frac{1}{2})D$. When the length L is infinite, the angle $\Phi$ is set to be about 30°. When the length L is smaller than a half of the inner diameter of the measuring pipe, i.e., $L<(\frac{1}{2})D$, the angle $\Phi$ is generally larger than 40°.

As described above, the angle $\Phi$ is relatively large. Gaps between opposing yokes 2 and opposing coils 3 are relatively large and magnetic flux directing opposite directions passes through the gaps. Then, nonsymmetrical magnetic field exists in the gaps. For this reason, fluctuations of a measured signal obtained by the electrodes 6 occurs.

A relationship between the functional distribution magnetic field and the measured signal will be described on the basis of extensive studies made by the present inventor.

In an electromagnetic flowmeter having a relatively small magnetic field length in the fluid flow direction, a relationship between the pair of electrodes 6 and an electromagnetic force generated therebetween is given by equation (1) below:

$$E = (D/\pi) \int_0^1 \int_0^{2\pi} (WyBx + WxBy) \cdot Vz \cdot R \cdot d\theta \cdot dR \quad (1)$$

where D is the inner diameter of the measuring pipe 1, R=r/a, $\theta$ is the angle used for polar coordinate transformation, Bx is the magnetic flux density at a point P in the x direction, By is the magnetic flux density at the point P in the y direction, Wx is a weighting function representing a magnitude of an electromagnetic force generated between the electrodes at the point P in the x direction, Wy is a weighting function representing a magnitude of an electromotive force generated between the electrodes at the point P in the y direction, and Vz is the flow speed in the measuring pipe 1 in a direction perpendicular to the drawing surface. The Wx and Wy are represented by equations (2) and (3), respectively:

$$Wx = (R^2 \sin 2\theta)/(1 - 2R^2 \cos 2\theta + R^4) \quad (2)$$

$$Wy = (1 - R^2 \cos 2\theta)/(1 - 2R^2 \cos 2\theta + R^4) \quad (3)$$

Figure 5:
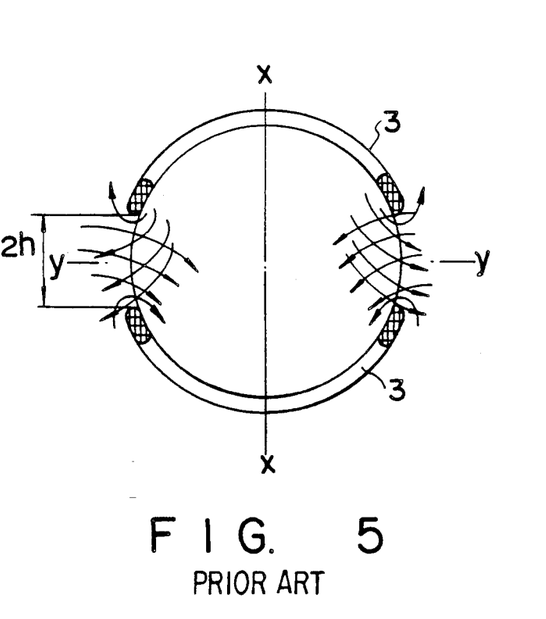
Figure 6:
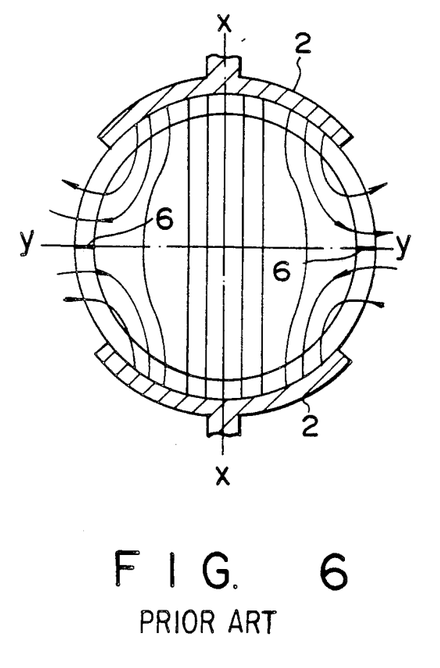
Figure 7:
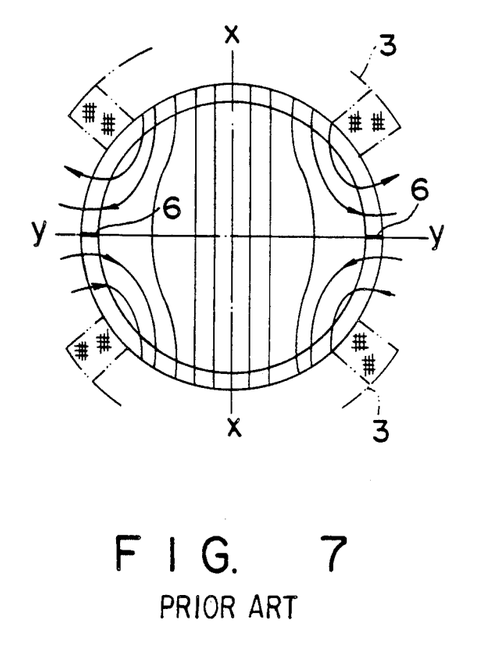

Since a distance 2h in FIG. 5 is large near the electrodes of the conventional electromagnetic flowmeter using the functional distribution magnetic field, magnetic fluxes having opposite magnetization directions with respect to the y-y line are generated parallel to the y-y line obtained by connecting the electrodes 6 are generated near the electrodes 6, as illustrated in FIGS. 5, 6 and 7. Therefore, the magnetic flux densities Bx and By are complicatedly distributed near the electrodes. As can be understood from equation (1), the magnetic flux densities Bx and By are combined with the weighting functions Wx and Wy to obtain Bx.Wy and By.Wx which influence an electromotive force E. For this reason, when an eccentric flow passes near the electrodes, the measured signal is fluctuated.

In an electromagnetic flowmeter having no function of generating a functional distribution magnetic field, when a fluid to be measured eccentrically flows, a general flow rate measurement error occurs in addition to the fluctuation of the measured signal.

SUMMARY OF THE INVENTION

The present invention has been made in consideration of the above situation, and has as its object to provide an electromagnetic flowmeter having better performance than that of a conventional electromagnetic flowmeter.

It is another object of the present invention to provide an electromagnetic flow meter having a small fluctuation magnitude of a measured signal.

It is still another object of the present invention to provide a compact electromagnetic flowmeter having a small fluctuation of a measured signal.

It is still another object of the present invention to provide an electromagnetic flowmeter having a short rise time of a magnetic flux.

In order to achieve the above objects of the present invention, there is provided an electromagnetic flowmeter comprising:

a measuring pipe through which a fluid to be measured flows;

at least a pair of magnetic field generating units for applying a magnetic field to the fluid to be measured; and at least a pair of electrodes for detecting an electromotive force induced in the fluid by the magnetic field, wherein the pair of magnetic field generating units generate a substantially functional distribution magnetic field in the measuring pipe, and each of the pair of magnetic field generating units comprises a plurality of coils.

When the number of coils is given as N (N is an integer of 2 or more), a turn ratio of each coil piece is explained by a product of a turn number of windings of a sine distribution coil and domain integration of a sine function. The total of the turn numbers of the pieces is equal to the turn number of the sin distribution coil.

The plurality of coils comprise, e.g., coils with pole pieces and saddle coils.

The electromagnetic flowmeter having the above arrangement is substantially free from an influence of an eccentric flow and can provide a measured signal having a small fluctuation magnitude.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A to 7 are views for explaining a conventional electromagnetic flowmeter;

FIGS. 11 to 14B are views showing modifications of the electromagnetic flowmeter shown in FIGS. 9A and 9B;

DETAILED DESCRIPTION OF THE PREFERRED EMBODIMENTS

In order to best understand the present invention, the principle based on the present invention will be described below.

When eccentric flows are present in areas having weighting functions of 0.5 and 2.0 under the same magnetic flux density, an influence of the eccentric flow flowing in the area having the weighting function of 2.0 on measurement values is about four times that of the eccentric flow flowing in the area having the weighting function of 0.5. The area having the weighting function of 2.0 is located near the electrodes. It is very effective to reduce the influences of the eccentric flows by causing a magnetic field in the measuring pipe to come close to a functional distribution magnetic field (i.e., the strength of the magnetic field is a reciprocal number to the weighting function) to weaken a magnetic field near the electrodes.

Figure 8:
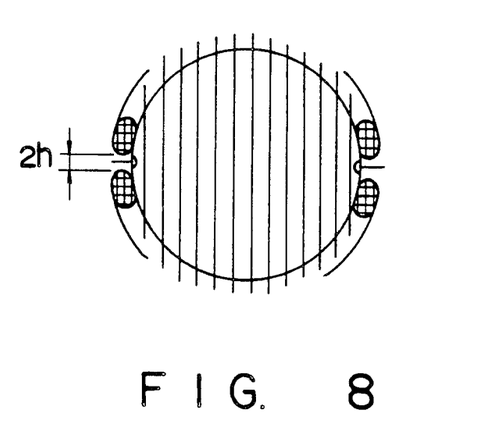
FIG. 8 is a view for explaining the principle of the present invention.

As shown in FIG. 8, when a distance $2h$ between the excitation coils 3 is reduced, the opposing magnetic fluxes are canceled to each other, and the magnetic flux between the coils is almost zero. As shown in FIG. 8, almost all the magnetic fluxes are formed in a direction perpendicular to a line obtained by connecting the electrodes 6. As a result, By $\approx 0$ is obtained, so that equation (1) is modified into equation (1a).

$$E = (D/\pi) \int_0^1 \int_0^{2\pi} Wy \cdot Bx \cdot Vz \cdot R \cdot d\theta \cdot dR \tag{1a}$$

When a functional magnetic field is to be obtained by an excitation coil and the like, relation $Bx=(1/Wy)$ is equivalently established. Equation (1a) can be simplified to obtain equation (1b) below:

$$E = (D/\pi) \int_0^1 \int_0^{2\pi} Vz \cdot R \cdot d\theta \cdot dR \tag{1b}$$

It is ideal to obtain the electromotive force E on the basis of equation (1b). Even if, however, equation (1b) is not perfectly satisfied, the influences of eccentric flows on the measurement values can be reduced when the value Wy.Bx adjacent to the electrodes is smaller than the Wy and/or the value Wy.Bx far from the electrodes is greater than the Wy.

An excitation portion of an electromagnetic flowmeter according to the present invention aims at obtaining a structure for generating a magnetic flux given by equation (1a).

An electromagnetic flowmeter according to an embodiment of the present invention will be described with reference to the accompanying drawings.

Figures 9A, 9B, 10:
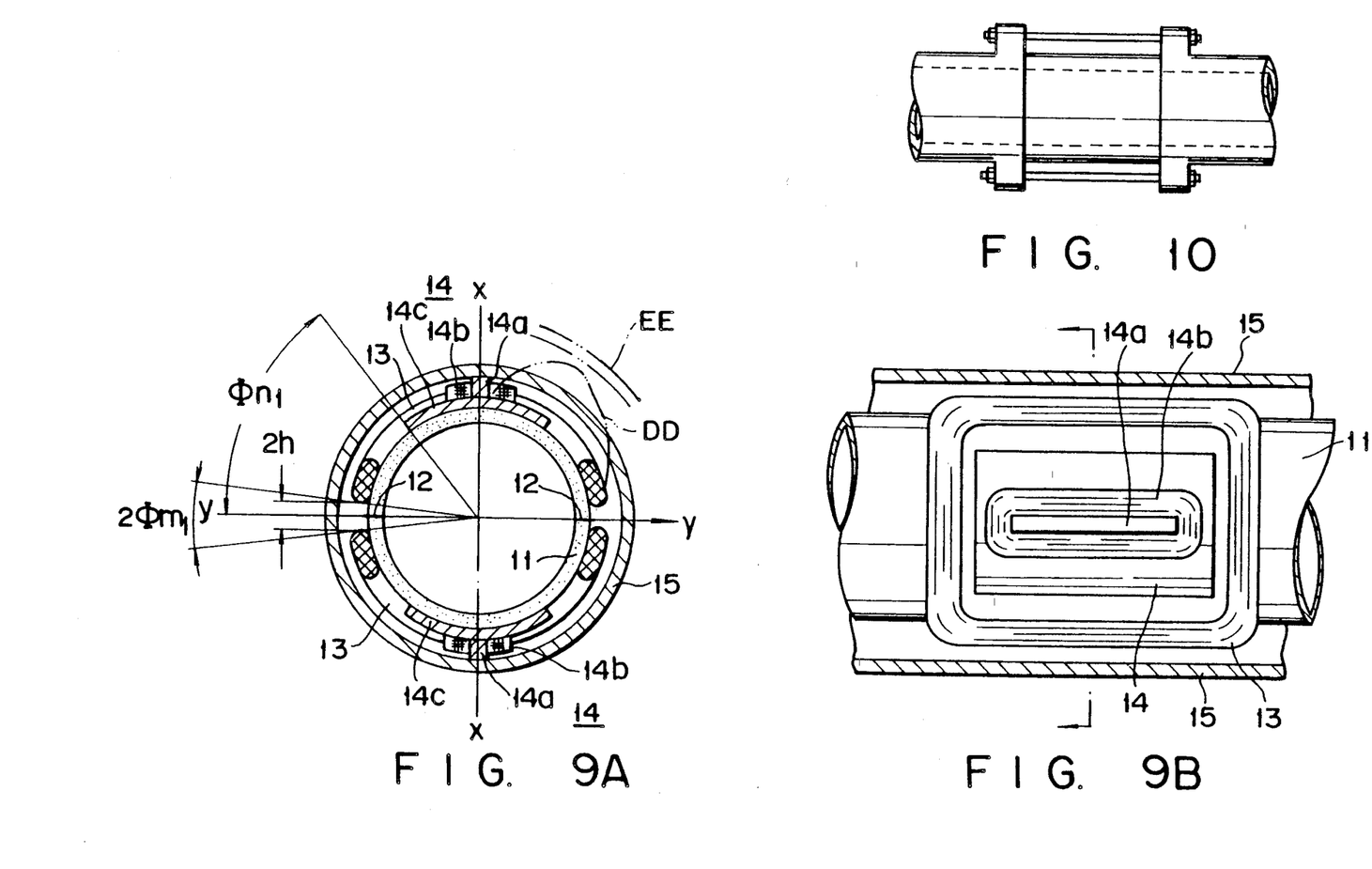
FIGS. 9A and 9B are views for explaining an arrangement of an electromagnetic flowmeter according to the first embodiment of the present invention.
FIG. 10 is a view showing an outer configuration of a wafer type electromagnetic flowmeter.

Ideally, as indicated by the alternate long and two short dashed line DD in FIG. 9A, when excitation coils (sine distribution coils) whose thickness is distributed in a sin curve are formed so that end portions of the coils are located near the electrodes 12, a functional distribution magnetic field can be obtained. At the same time, the distance 2h between the coils can be almost zero, thereby satisfying equation (1a).

According to this technique, however, the maximum thickness of each excitation coil is increased. For this reason, the size of the outer casing is increased, as indicated by the alternate long and two short dashed line EE. Therefore this excitation coil cannot be used in an electromagnetic flowmeter, so called wafer type, which is inserted between the pipes which are then bolted shown in FIG. 10.

In order to solve this problem, the first embodiment having a structure shown in FIGS. 9A and 9B is provided.

The structure of the electromagnetic flowmeter shown in FIGS. 9A and 9B will be described below.

A pair of opposite electrodes 12 are mounted on the outer wall surface of a measuring pipe 11 through which a fluid to be measured flows. The electrodes 12 are perpendicular to a fluid flow direction and a direction of a magnetic flux and are located on a line y-y passing across the axis of the measuring pipe 11. The electrodes 12 are in direct contact with the fluid. The electrodes 12 are insulated from the measuring pipe 11 when the measuring pipe 11 is mode of a conductive material with, for example, a lining made of an insulative material.

A pair of excitation portions comprise a pair of saddle excitation coils 13 and a pair of coils 14 with pole pieces. The coils 13 and 14 cooperate to generate a magnetic field substantially equivalent to that generated by the sine distribution coil indicated by the alternate long and two short dashed line DD.

Each coil 14 with a pole piece comprises a yoke 14 made of a magnetic material, a T-shaped pole piece 14a made of a magnetic material, and a coil 14b wound around the pole piece 14a. The coils 14 are located to oppose each other on the outer wall surface of the measuring pipe 11 in a direction perpendicular to the line y-y obtained by connecting the electrodes 12. At the same time, the pole piece 14a is located on a line x-x passing across the axis of the measuring pipe.

The saddle coils 13 are located to surround the coils 14 and oppose each other adjacent to the outer wall surface of the measuring pipe 11. The end portions of the saddle excitation coils 13 are located near the electrodes 12.

An outer casing 15 protects the measuring pipe 11, the electrodes 12, and the coils 13 and 14. The outer casing 15 is made of a magnetic material or the like. The inner surface of the outer casing 15 is in tight contact with the pole pieces 14a, and the outer casing 15 serves as a magnetic path for the coils 14.

A total turn count of the coils 13 and 14 is determined on the basis of a magnitude of a target electromotive force E and a magnitude of an excitation current. If a total turn count of the coils is given as 2T, total turn counts of the upper coils 13 and 14, and the lower coils 13 and 14 are respectively T.

The turn count of each coil 13 or 14 is equal to that of a half of the sine distribution coil having a turn count T. More specifically, the total turn count of each coil 13 or 14 is determined by equations (4) to (6) for dividing the total turn count T into n (n is an integer) portions:

$$T_1 \text{ turn count} = -T \int_{\Phi m1}^{\Phi n1} \sin\Phi d\Phi = -T[\cos\Phi]_{\Phi m1}^{\Phi n1} \quad (4)$$

$$T_2 \text{ turn count} = -T \int_{\Phi n1}^{\Phi n2} \sin\Phi d\Phi = -T[\cos\Phi]_{\Phi n1}^{\Phi n2} \quad (5)$$

...

...

...

$$T_n \text{ turn count} = -T \int_{\Phi n(n-1)}^{\Phi nn} \sin\Phi d\Phi = -T[\cos\Phi]_{\Phi n(n-1)}^{\Phi nn} \quad (6)$$

More specifically, the diameter of the measuring pipe 11 is given as 75 mm, the total turn count $2T = 1,440$ (turns), $\Phi m1 = 0°$, $\Phi n1 = 40°$, and $\Phi n2 = 90°$. These angles are obtained by a computer simulation and experiments. By using equations (4) and (5), $$T_1 \text{ turn count} = -720[\cos\Phi]_{0°}^{40°} = 168$$

$$T_2 \text{ turn count} = -720[\cos\Phi]_{40°}^{90°} = 552$$

That is, the coil 13 has 168 turns, and the coil 14 has 552 turns.

In the structure shown in FIGS. 9A and 9B, two coils 13 and 14 cooperate to have a function substantially equivalent to the sine distribution coil. At the same time, the distance 2h between the ends of the coils 13 is small. Therefore, the magnetic flux near the electrodes 12 in the y-y direction is reduced, and the fluctuation of the measured signal can be reduced.

Figure 11:
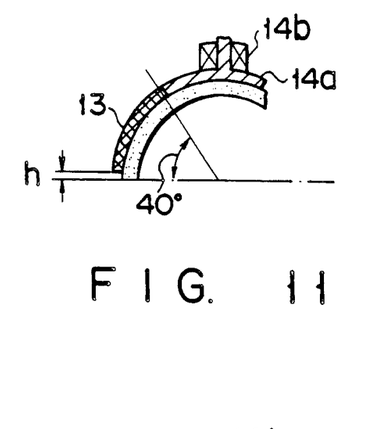

In an electromagnetic flowmeter which requires a small excitation current and uses coils each having a large turn count, the saddle coil 13 is preferably made thin, as shown in FIG. 11, and is laid out in the entire 40° range.

Figure 12:
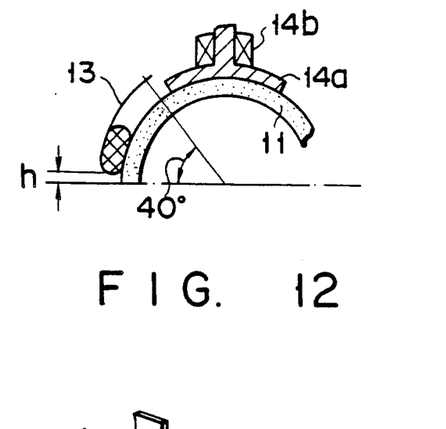

It is difficult to manufacture the coils 13 in the arrangement shown in FIG. 11. In order to solve this problem, a coil 13 may be obtained as a mass and may be located near the electrode 12 so as to reduce the distance 2h as shown in FIG. 12. In this case, the turn count $T_1$ of the coil 13 is preferably reduced slightly, e.g., by about 10% from the calculated turn count. The structure in FIG. 12 is excellent in working efficiency and the like.

Figure 13A:
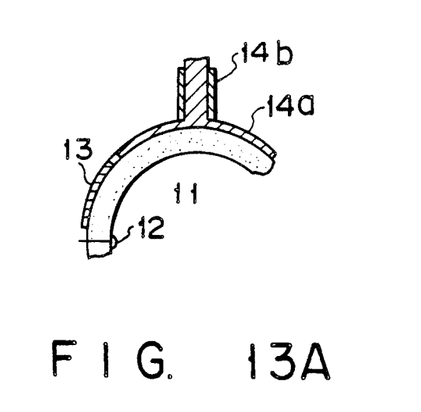
Figure 13B:
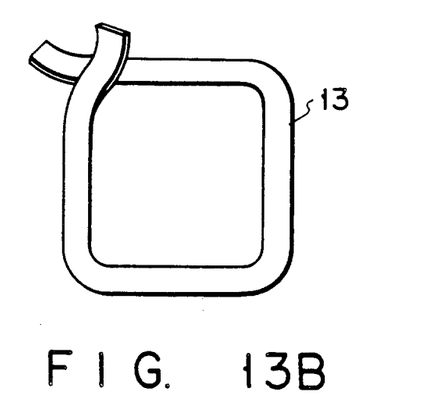
Figure 13C:
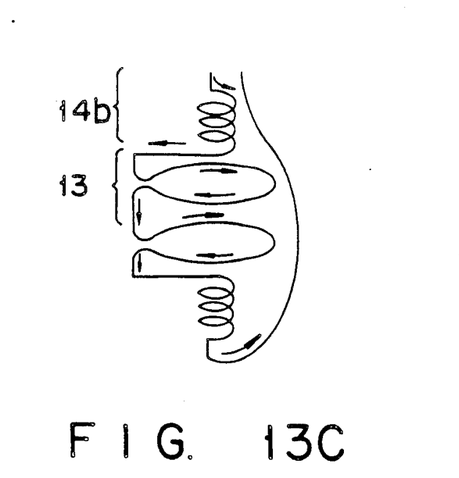
Figure 14A:
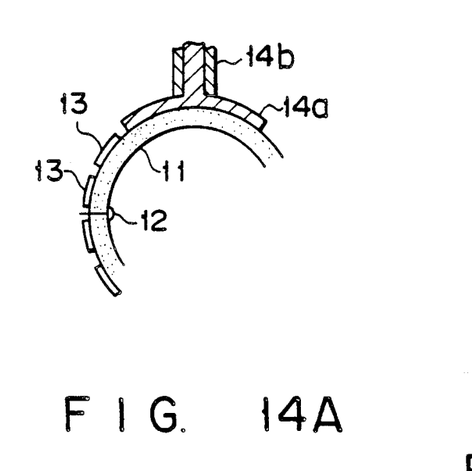
Figure 14B:
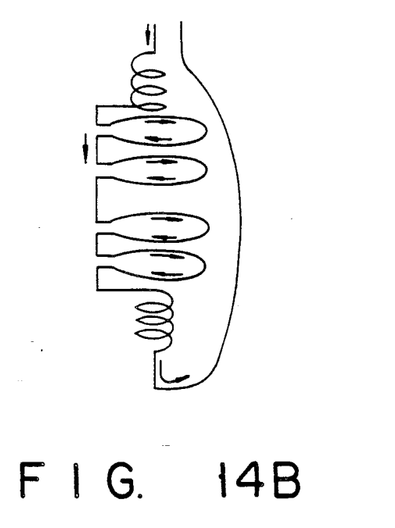

In an electromagnetic flowmeter which requires a large excitation current and uses coils each having a small turn count, a plate-like coil having one or a plurality of turns can be used as the coil 13. FIG. 13A shows a plate-like coil having one turn, and FIG. 14A shows a plate-like coil having two turns. FIG. 13B shows a plane structure of the plate-like coil 13. FIGS. 13C and 14B show equivalent circuits of magnetic generating portions shown in FIGS. 13A and 14A, respectively.

When the structures shown in FIGS. 13A to 14B are employed, a magnetic flux along the line y-y can be eliminated or extremely reduced, and the fluctuation of the measured signal can be minimized.

The plate-like coil 13 may be formed using a superconductor material. When a winding portion 14b of the coil with a pole piece has a small turn count, it may be made of a thick plate-like coil or a superconductor coil.

Figure 15:
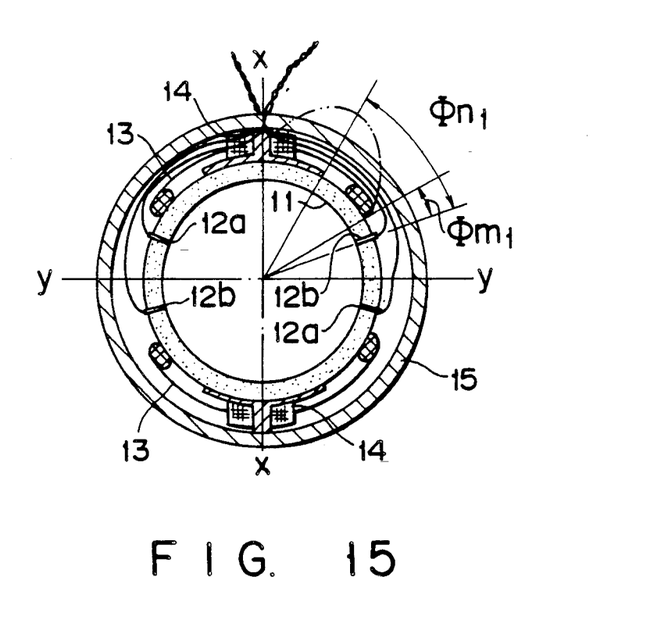
FIG. 15 is a sectional view showing an arrangement of an electromagnetic flowmeter according to the second embodiment of the present invention.

The second embodiment of the present invention will be described with reference to FIG. 15.

The second embodiment exemplifies an electromagnetic flowmeter having plural pairs of electrodes. Referring to FIG. 15, plural pairs of electrodes 12a and 12b are mounted on a measuring pipe 11. Saddle excitation coils 13 and coils 14 with pole pieces which have a function substantially equivalent to the sin distribution excitation coil indicated by the alternate long and two short dashed line in FIG. 15 are mounted on the outer wall surface of the measuring pipe 11. The saddle excitation coils 13 are located near the electrodes 12a and 12b. The turns of the coils 13 and 14 are calculated on the basis of equations (4) and (5).

In this embodiment, the combination of the coils 13 and 14 also provides a function substantially equivalent to the sine distribution coil. In addition, the saddle coils 13 are located near the electrodes. Therefore, the electromagnetic flowmeter is substantially free from an influence of an eccentric flow by the sine distribution coil and provides a measured signal having a small fluctuation magnitude because the edges are adjacent to the electrodes.

Figure 16A:
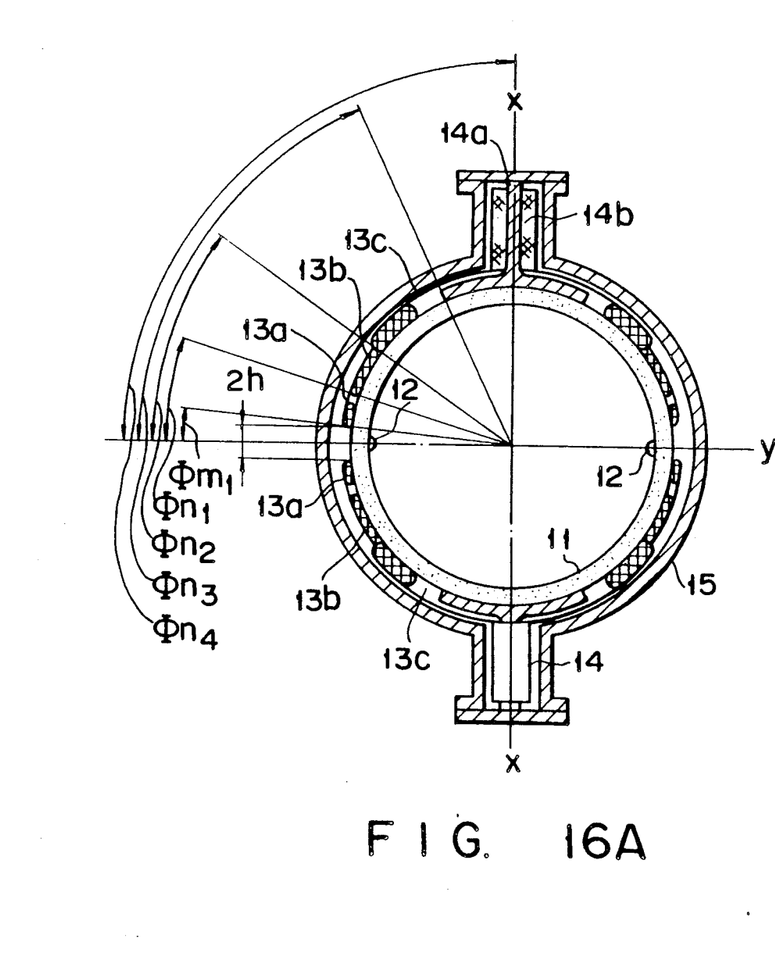
FIGS. 16A and 16B are views showing an arrangement of an electromagnetic flowmeter according to the third embodiment of the present invention.
Figure 16B:
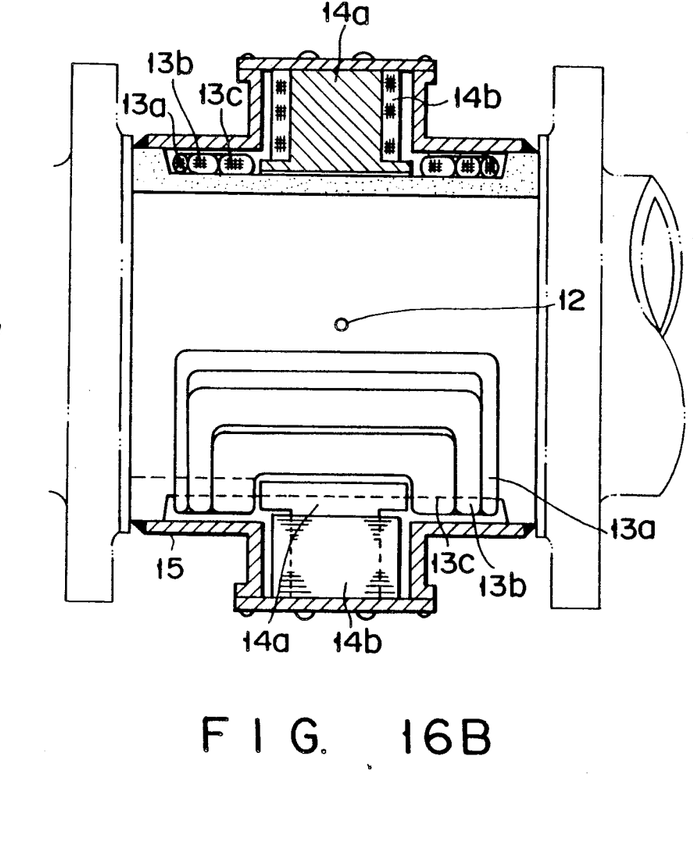

The third embodiment of the present invention will be described with reference to FIGS. 16A and 16B. This embodiment exemplifies an electromagnetic flowmeter in which a sin distribution coil is divided into four parts. Each excitation portion comprises three saddle coils 13A, 13B, and 13C and a coil 14 with a pole piece. The turn counts of the excitation coils 13a, 13b, 13c, and 14 are determined on the basis of equations (4) to (6).

It is possible to slightly shift the coil positions from positions obtained by the calculations. In this case, for example, the turn counts and/or exitation current are corrected in accordance with experiments and the like.

The present invention is not limited to the particular embodiments described above. In the above embodiments, the outer casing 15 comprises a cylinder. However a rectangular parallelepiped casing may be used.

In the above embodiments, each excitation portion comprises a combination of a coil with a pole piece and a saddle coil (or saddle coils). However, the excitation portion may be constituted by only saddle coils, and the structure of the coil of the excitation portion may be arbitrarily determined.

Figure 17:
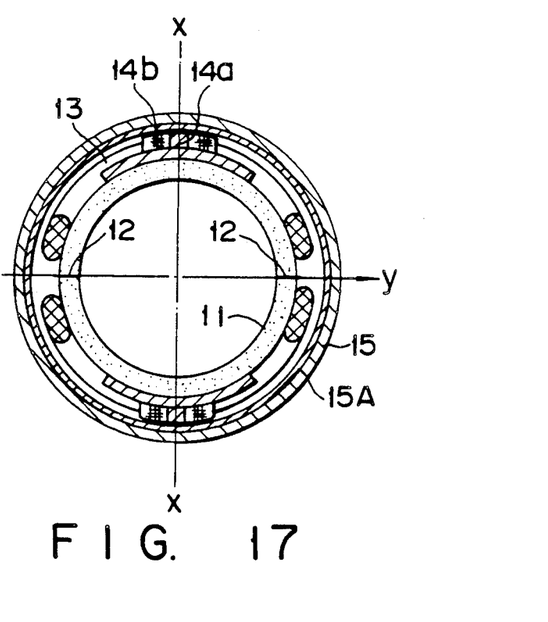
FIG. 17 is a sectional view showing a modification of a structure of an outer casing 15.

In each embodiment described above, the outer casing 15 is made of a magnetic material, and its inner surface is in tight contact with the outer end faces of the pole piece 14a, and the outer casing 15 serves as a feedback magnetic path for the coil 14. However, the present invention is not limited to this. The outer casing 15 may be made of a nonmagnetic material, and a space between the outer casing 15 and the measuring pipe 11 may serve as a feedback magnetic path. In addition, as shown in FIG. 17, a core 15A may be formed inside the outer casing 15.

The outer casing 15 is preferably brought into tight contact with the rear end face of the pole piece 14a. However, the present invention is not limited to this. As shown in FIG. 17, a gap may be formed between the outer casing 15 and the pole piece 14a due to a structural reason or the like. In this case, an excitation current must be increased by about 20% to obtain a predetermined magnetic flux density, as compared with the case wherein the outer casing is in tight contact with the pole piece. However, high mounting precision of the outer casing is not required, the structure of the electromagnetic flowmeter can be simplified, and assembly efficiency can be improved.

When the outer casing 15 is made of a nonmagnetic material, the outer casing itself has a function of an air core. For this reason, a larger excitation current must flow in each coil than that flowing in the magnetic outer casing. When this arrangement is employed, however, the rise time of the magnetic flux can be shortened, so that an electromagnetic flowmeter for high-speed measurement an be obtained. When the rise time of the magnetic flux can be shortened, a flow rate can be measured independently of electrochemical noise generated by the electrodes 12.

When a laminated core is arranged inside the outer casing 15, the laminated core may be brought into tight contact with the inner surface of the outer casing or spaced apart therefrom by a predetermined distance. In addition, a gap may be formed between the inner surface of the laminated core and the rear end face of the pole piece 14a, or these members may be brought into tight contact with each other. A magnetic powder may be formed into a diced core with a resin in place of the laminated core. When the laminated core or the dust core itself serves as an outer casing, the outer casing 15 may be omitted.

The pole piece 14a may be made of a laminated core or a dust core.

Figure 18:
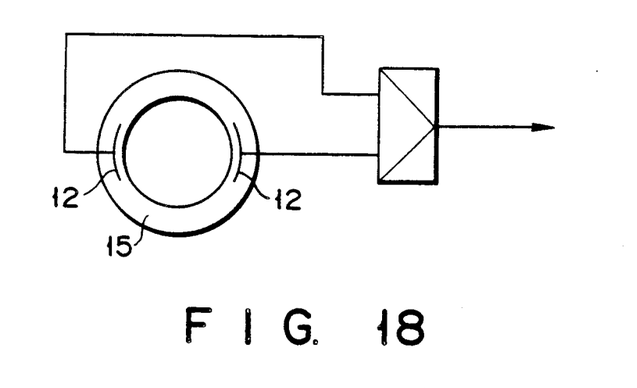
FIGS. 18, 19A, 19B and 19C show modifications of the electromagnetic flowmeters according to the embodiments.

The present invention is not limited to an electromagnetic flowmeter of the type having electrodes which contact a fluid to be measured the flow rate of the fluid. It can be applied to an electromagnetic flowmeter of the type shown in FIG. 18, whose electrodes exist in the measuring pipe and are connected to the fluid by statistic electrostatic capacitance in terms of an alternating current.

If the yoke portion 14c of the coil 14, is made larger, the magnetic flux density around the axis of the measuring pipe 11 will be reduced, possibly making it difficult to measure the flow rate accurately. In the embodiment, since the yoke portion 14c is relatively small, magnetic fluxes extend around the axis of the measuring pipe 11. Further, a large saddle-shaped coil is used in combination with the coil 14, thus improving the characteristics of the flowmeter which would be insufficient if only the coil 14 were used.

In the electromagnetic flowmeter of each embodiment described above, the excitation portions for generating a functional distribution magnetic field are made of a plurality of coils. More specifically, the function substantially equivalent to the sine distribution coil can be obtained by the plurality of coils, thereby reducing an influence of the eccentric flow on the measured signal. The coil ends are located near the electrodes 12 to reduce the fluctuations of the measured signals. In addition, in the above embodiment, the excitation portion is made of the coil 14 with a pole piece and the saddle coil 13. As compared with an arrangement using the sin distribution coil, the maximum thickness of the coil can be reduced to provide a compact electromagnetic flowmeter and facilitate the manufacture of coils.

Figure 19A:
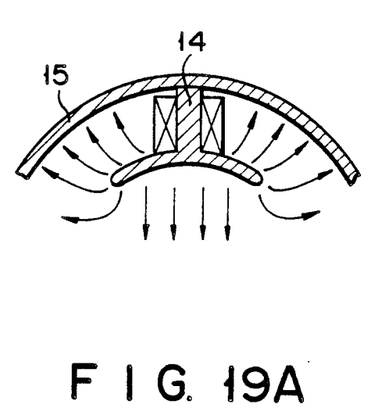
Figure 19B:
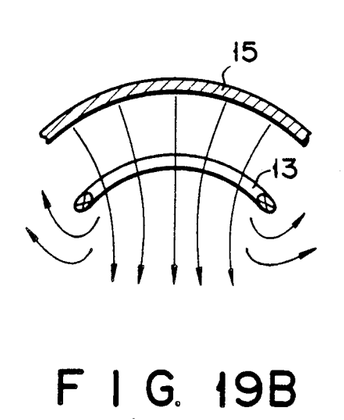
Figure 19C:
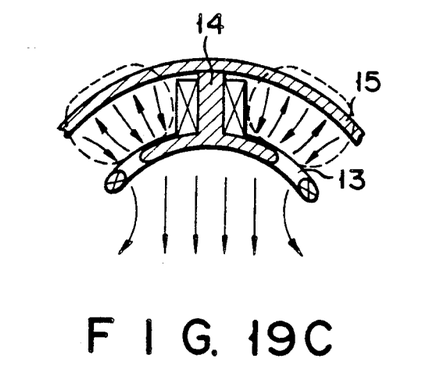

Due to the combination of two coils 13 and 14, the leakage of magnetic fluxes can be reduced. More specifically, in only the coil 14 were used, leakage magnetic fluxes would be generated as is shown in FIG. 19A. On the other hand, if only the coil 13 were used, leakage magnetic fluxes would be generated as is illustrated in FIG. 19B. Since the coils 13 and 14 are used in combination, the leakage magnetic fluxes cancel out those area shown by dotted lines in FIG. 19C, whereby the total amount of leakage magnetic fluxes is reduced. As a result, the power loss is reduced, and the magnetic flux generator can be driven with a small current. When a small current is supplied to the magnetic flux generator, the magnetism increases quickly, thereby frequency of magnetic excitation can be increased. The higher the magnetic excitation frequency, the more easily can signals be separated from so-called 1/f noise. Hence the S/N ratio can be increased, thus enhancing the characteristic of the electromagnetic flowmeter.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. An electromagnetic flowmeter for applying a magnetic field to a fluid to be measured and using electrodes to extract an electromotive force induced in the fluid by the magnetic field, comprising:
   a measuring pipe through which the fluid to be measured flows;
   magnetic field generating units for applying the magnetic field to the fluid to be measured; and
   electrodes for detecting the electromotive force induced in the fluid by the magnetic field,
   wherein said magnetic field generating units generate a substantially functional distribution magnetic field in said measuring pipe, and each of said magnetic field generating units comprises a plurality of coils including a saddle coil.

2. A flowmeter according to claim 1, wherein said plurality of coils of each magnetic field generating unit generate a magnetic field substantially equivalent to that generated by a sine distribution coil.

3. A flowmeter according to claim 1, wherein one of said plurality of coils comprises a coil with a pole piece made of a magnetic material.

4. A flowmeter according to claim 3, wherein said electromagnetic flowmeter comprises an outer casing for protecting said measuring pipe, said electrodes, and said magnetic field generating units, said outer casing being in tight contact with or separated by a predetermined distance from said pole piece of said coil with said pole piece.

5. A flowmeter according to claim 4, wherein said outer casing includes means serving as a magnetic path of a magnetic field generated by said coil with said pole piece.

6. A flowmeter according to claim 3, wherein said coil with said pole piece is located at a circumferential position on said pipe midway between said electrodes and surrounded by remaining coils.

7. A flowmeter according to claim 3, wherein said coil with said pole piece is located at a circumferential position on said pipe midway between said electrodes and surrounded by remaining coils, and an outermost one of the remaining coils is arranged adjacent to said electrodes, so as to reduce magnetic fluxes located in the neighborhood of said electrodes.

8. A flowmeter according to claim 1, wherein one of said plurality of coils comprises a coil with a pole piece made of a magnetic material, and the remaining coils are saddle coils.

9. A flowmeter according to claim 8, wherein said coil with said pole piece is located at a circumferential position on said pipe midway between said electrode and surrounded by said saddle coils.

10. A flowmeter according to claim 8, wherein said coil with said pole piece is located at a circumferential position on said pipe midway between said electrodes and surrounded by said saddle coils, and an outermost one of the saddle coils is arranged adjacent to the electrodes so as to reduce magnetic fluxes located in the neighborhood of said electrodes.

11. A flowmeter according to claim 1, wherein said electrodes directly contact the fluid so as to detect the electromotive force, or connected to the fluid by an electrostatic capacitor in terms of an alternating current so as to detect the electromotive force.

12. An electromagnetic flowmeter for applying a magnetic field to a fluid to be measured and using electrodes to extract an electromotive force induced in the fluid by the magnetic field, comprising:
    a measuring pipe through which the fluid to be measured flows;
    magnetic field generating units for applying the magnetic field to the fluid to be measured; and
    electrodes for detecting the electromotive force induced in the fluid by the magnetic field, wherein said magnetic field generating units generate a substantially functional distribution magnetic field in said measuring pipe, and each of said magnetic field generating units comprises a plurality of coils;
    wherein the number of said plurality of coils of said each magnetic field generating unit is N, and a turn ratio of said N coils is substantially a ratio of domain integrations of a sine function.

13. A flowmeter according to claim 12, wherein, in order to reduce a fluctuation magnitude of the electromotive force, said each magnetic field generating unit is arranged to suppress generation of a magnetic field near said electrodes in a direction parallel to a line obtained by connecting said electrodes.

14. An electromagnetic flowmeter for applying a magnetic field to a fluid to be measured and using electrodes to extract an electromotive force induced in the fluid by the magnetic field, comprising:
    a measuring pipe through which the fluid to be measured flows;
    magnetic field generating units for applying the magnetic field to the fluid to be measured; and
    electrodes for detecting the electromotive force induced in the fluid by the magnetic field, wherein said magnetic field generating units generate a substantially functional distribution magnetic field in said measuring pipe, and each of said magnetic field generating units comprises a plurality of coils;
    wherein a turn count $T_n$ of an nth coil of said plurality of coils is determined by the following equation:

$$T_n = -T \int_{\Phi_n - 1}^{\Phi_n} \sin\Phi d\Phi$$

where T is a total turn count of an excitation coil portion, $\Phi n$ is an angle defined by a line obtained by connecting said electrodes and a line obtained by connecting an axis of said measuring pipe and an end portion of said nth coil, and $\Phi n-1$ is an angle defined by said line obtained by connecting said electrodes and a line obtained by connecting the axis of said measuring pipe and an end portion of an $(n-1)$th coil.

15. An electromagnetic flowmeter comprising:

a measuring pipe through which the fluid to be measured flows;

electrodes for detecting an electromotive force induced by a magnetic field; and magnetic field generating units for generating the magnetic field in said measuring pipe, each of said plurality of magnetic field generating means comprising a plurality of coils including a saddle coil and generating a magnetic field similar to that generated by one sine distribution coil.

16. A flowmeter according to claim 15, wherein, in order to reduce a fluctuation magnitude of the electromotive force, said each magnetic field generating unit is arranged to suppress generation of a magnetic field near said electrodes in a direction parallel to a line obtained by connecting said electrodes.

17. A flowmeter according to claim 15, wherein one of said plurality of coils comprises a coil with a pole piece made of a magnetic material.

18. A flowmeter according to claim 17, wherein
said coil with said pole piece is located at a circumferential position on said pipe midway between said electrodes and surrounded by remaining coils.

19. A flowmeter according to claim 17, wherein
said coil with said pole piece is located at a circumferential position on said pipe midway between said electrodes and surrounded by remaining coils, and an outermost one of the remaining coils is arranged adjacent to the electrodes, so as to reduce magnetic fluxes located in the neighborhood of said electrodes.

20. An electromagnetic flowmeter comprising:

a measuring pipe through which the fluid to be measured flows;

electrodes for detecting an electromotive force induced by a magnetic field; and magnetic field generating means for generating the magnetic field in said measuring pipe, each of said plurality of magnetic field generating means comprising a plurality of coils including a saddle coil and generating a magnetic field similar to that generated by one sine distribution coil;

wherein the number of said plurality of coils of said each magnetic field generating unit is N, and a turn ratio of said N coils is substantially equal to a turn ratio of pieces obtained by dividing the sine distribution coil into N portions.

21. An electromagnetic flowmeter comprising:

a measuring pipe through which the fluid to be measured flows;

electrodes for detecting an electromotive force induced by a magnetic field; and magnetic field generating means for generating the magnetic field in said measuring pipe, each of said plurality of magnetic field generating means comprising a plurality of coils including a saddle coil and generating a magnetic field similar to that generated by one sine distribution coil;

wherein one of said plurality of coils comprises a coil with a pole piece made of a magnetic material;

wherein remaining coils except for said coil with said pole piece comprise saddle coils.

* * * * *